US009079514B2

(12) United States Patent
Haller

(10) Patent No.: US 9,079,514 B2
(45) Date of Patent: Jul. 14, 2015

(54) VEHICLE SEAT COMPRISING AN ADJUSTABLE BACKREST SHAPE

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/050,645

(22) Filed: Oct. 10, 2013

(65) Prior Publication Data

US 2014/0103690 A1 Apr. 17, 2014

(30) Foreign Application Priority Data

Oct. 11, 2012 (DE) .......................... 10 2012 109 710

(51) Int. Cl.
| | |
|---|---|
| *B60N 2/42* | (2006.01) |
| *B60R 21/00* | (2006.01) |
| *B60N 2/22* | (2006.01) |
| *B60N 2/68* | (2006.01) |
| *B60N 2/64* | (2006.01) |
| *B60N 2/66* | (2006.01) |
| *B60N 2/28* | (2006.01) |
| *B60N 2/427* | (2006.01) |

(Continued)

(52) U.S. Cl.
CPC .............. *B60N 2/2222* (2013.01); *B60N 2/245* (2013.01); *B60N 2/68* (2013.01); *B60N 2/24* (2013.01); *B60N 2/2884* (2013.01); *B60N 2/427* (2013.01); *B60N 2/4214* (2013.01); *B60N 2/42709* (2013.01); *B60N 2/42745* (2013.01); *B60N 2/643* (2013.01); *B60N 2/66* (2013.01); *B60N 2002/022* (2013.01); *B60N 2002/0208* (2013.01)

(58) Field of Classification Search
CPC .... B60N 2/42709; B60N 2/4228; B60N 2/24; B60N 2/68; B60N 2/2884; B60N 2/4214; B60N 2/427; B60N 2/502; B60N 2/64; B60N 2/4221; B60N 2/643; B60N 2/42745; B60N 2/66
USPC .................... 297/301.1, 216.13, 216.11, 471, 297/216.14, 216.1, 354.11, 353, 354.1, 297/284.1

See application file for complete search history.

(56) References Cited

U.S. PATENT DOCUMENTS

| | | | | |
|---|---|---|---|---|
| 5,439,272 A | * | 8/1995 | Hallet et al. | .................. 297/479 |
| 5,509,716 A | * | 4/1996 | Kolena et al. | ............ 297/216.13 |
| 5,645,316 A | * | 7/1997 | Aufrere et al. | ........... 297/216.13 |

(Continued)

FOREIGN PATENT DOCUMENTS

| | | |
|---|---|---|
| DE | 1258740 | 1/1968 |
| DE | 3046049 | 7/1982 |

(Continued)

OTHER PUBLICATIONS

Examination Report prepared by the German Patent Office of German Application No. 10 2012 109 710.0 on Jun. 18, 2013.

(Continued)

*Primary Examiner* — Chi Q Nguyen
(74) *Attorney, Agent, or Firm* — Sheridan Ross P.C.

(57) ABSTRACT

A vehicle seat is provided including a seat frame having a sitting surface frame and a backrest frame, wherein the backrest frame has a left backrest longitudinal strut and a right backrest longitudinal strut as well as a lower cross strut and an upper cross strut, the right and left backrest longitudinal struts being pivotably arranged on the lower cross strut in such a way that the backrest frame is helically deformable.

16 Claims, 9 Drawing Sheets

(51) Int. Cl.
*B60N 2/24* (2006.01)
*B60N 2/02* (2006.01)

(56) References Cited

U.S. PATENT DOCUMENTS

| | | | |
|---|---|---|---|
| 5,918,934 A * | 7/1999 | Siegrist | 297/250.1 |
| 6,109,690 A * | 8/2000 | Wu et al. | 297/216.13 |
| 6,604,788 B1 * | 8/2003 | Humer | 297/216.13 |
| 6,767,055 B1 * | 7/2004 | Sparks | 297/216.14 |
| 6,896,324 B1 * | 5/2005 | Kull et al. | 297/216.1 |
| 6,910,736 B2 | 6/2005 | White | |
| 7,066,537 B2 | 6/2006 | Coffield et al. | |
| 7,517,024 B2 | 4/2009 | Cvek | |
| 7,717,513 B2 | 5/2010 | Ueda | |
| 2003/0127896 A1 | 7/2003 | Deimen et al. | |
| 2011/0241394 A1 * | 10/2011 | Yamaguchi et al. | 297/216.14 |
| 2011/0278886 A1 * | 11/2011 | Nitsuma | 297/216.13 |
| 2012/0292961 A1 * | 11/2012 | Nitsuma et al. | 297/216.14 |
| 2013/0257117 A1 * | 10/2013 | Seki et al. | 297/216.1 |
| 2014/0049090 A1 * | 2/2014 | Mori et al. | 297/452.49 |

FOREIGN PATENT DOCUMENTS

| | | |
|---|---|---|
| DE | 10012035 A1 | 9/2001 |
| EP | 0347842 | 12/1989 |
| EP | 1306033 A2 | 5/2003 |
| FR | 2840786 A1 | 12/2003 |
| JP | 2007-119202 | 5/2007 |
| WO | WO 99/21456 A1 | 5/1999 |
| WO | WO 2004037047 A1 | 5/2004 |
| WO | WO 2008/031218 | 3/2008 |

OTHER PUBLICATIONS

Search Report for European Patent Application No. 13187686.4, dated Jan. 7, 2014, 3 pages.

* cited by examiner

VEHICLE SEAT COMPRISING AN ADJUSTABLE BACKREST SHAPE

CROSS-REFERENCE TO RELATED APPLICATION

This application claims the benefit of German Patent Application No. 102012109710.0 filed Oct. 11, 2012, the contents of which are incorporated herein by reference.

FIELD OF THE INVENTION

The invention relates to a vehicle seat.

BACKGROUND OF THE INVENTION

Seats of this type are known in a large number of different configurations. The sitting surface frame and the backrest frame of the seat frame may differ in their upholstery. Such known seats are adjustable in terms of their seat contour and backrest contour, but are generally not sufficiently adapted to the ergonomics of a user, meaning that comfort is accordingly restricted and the user's back is not adequately supported by the backrest frame in each position, which can sometimes lead to back complaints.

A vehicle seat is thus known from, for example, DE 4405397 C1, of which the backrest frame is subdivided into a plurality of subsegments which are pivotable with respect to one another about a vertical axis of rotation.

A vehicle seat fitted with a backrest frame which is movable in this manner does make it possible to improve access for users to actuation members behind the seat and, by means of the user's upper body rotating with respect to the centre of the vehicle, to achieve simpler passage in a two-door motor vehicle, even for back-seat passengers, without obliging those sitting at the front to vacate the vehicle.

However, this movable backrest frame is not optimally adapted to human ergonomics so that the user of such a vehicle seat may therefore in some circumstances not experience the required seating comfort but rather may even have to put up with back complaints owing to the use of such a vehicle seat.

SUMMARY OF THE INVENTION

Therefore, the present invention addresses the object of providing a vehicle seat which is better adapted to the ergonomics of the human back, in particular during rotational movements of the back, and thus at the same time provides enhanced seating comfort to any person using this vehicle seat.

This object is achieved by the features of claim 1. Advantageous embodiments of the invention are found in the dependent claims.

The inventive idea is that with a vehicle seat comprising a seat frame having a sitting surface frame and a backrest frame, said backrest frame has a left backrest longitudinal strut and a right backrest longitudinal strut and a lower cross strut and an upper cross strut, the right and left backrest longitudinal struts being pivotably arranged on the lower cross strut against a resistance in such a way that the backrest frame is helically deformable. This configuration allows a person sitting in such a vehicle seat according to the invention who is rotating his or her back or upper body to the left or right while resting via his back on the backrest frame, which is generally upholstered, the backrest frame is always in contact with the back of the user, who thus rests thereon in a relieving manner. The backrest frame rotates when this occurs, in such a way that the right and left backrest longitudinal struts pivot differently, said longitudinal struts remaining connected by the upper cross strut and the entire backrest frame thereby being helically deformed. The left and right backrest longitudinal struts may pivot during this process in such a way that, on the one hand, the two struts pivot backwards, albeit at different angles, in the vehicle seat longitudinal direction. On the other hand, it is also conceivable for the left or right backrest longitudinal strut to pivot forwards in the vehicle longitudinal direction and for the other backrest longitudinal strut to pivot backwards in the vehicle longitudinal direction. Since, in each case, this pivoting takes place against a resistance, the backrest longitudinal frame of the vehicle seat according to the invention supports the user as he rotates his back or upper body into its starting position, since the resistance makes it possible to accumulate a restoring force which is removed during rotation into the starting position. It is thus also ensured that even during rotation into the starting position, the entire backrest frame contacts and relieves the entire surface area of the back of the user as he rotates, since said backrest frame supports the rotational movement by removing the restoring force.

According to a first further inventive idea, the backrest frame additionally has a central backrest longitudinal strut which is attached pivotably about a substantially horizontal axis to the lower cross strut, the right and left backrest longitudinal struts being arranged at least in the region of their upper ends outside a fictious surface element formed by a 360° rotation of the central backrest longitudinal strut. Owing to this inventive embodiment of the backrest frame of a seat frame of a vehicle seat, deformation of the backrest frame is optimally adapted to human ergonomics, in particular during rotational movements of the back or upper body of a vehicle seat user. The individual elements of the backrest frame are in this case associated with individual elements of the human back and virtually identically reproduce the movement thereof during rotation of a user's back or upper body. The central backrest longitudinal strut is thus comparable to the human spine, whereas the lower and upper cross struts represent the human hip and shoulder axles respectively. The left and right backrest longitudinal strut can be compared to the muscular and ligamentous apparatus of the human back.

If a person sitting in such a vehicle seat according to the invention now rotates his/her back or upper body while resting via his/her back on the backrest frame, which is generally upholstered, the person's shoulder axle rotates with respect to their hip axle, the muscular and ligamentous apparatus being rotated helically or torsionally together with the spine. In the same manner, the right, left and central backrest longitudinal struts of the vehicle seat according to the invention rotate helically or torsionally with respect to one another, while remaining connected by the upper and lower cross struts. This ergonomic configuration of the backrest longitudinal strut not only improves comfort for the vehicle seat user but rather, owing to the constant and reliable contacting of his/her back with the, generally upholstered, backrest frame, also prevents back complaints, even during rotational movements of the back, because the backrest frame is able to absorb stresses, which consequently do not have to be borne by the user's ligamentous and muscular apparatus.

According to a further inventive idea, the upper cross strut is divided in two, into a first cross strut part arranged between the left backrest longitudinal strut and the central backrest longitudinal strut and a cross strut part arranged between the right backrest longitudinal strut and the central backrest longitudinal strut. This embodiment of the invention means that the vehicle seat according to the invention is even better adapted to human ergonomics since, just like the shoulder axle of a person, the upper cross strut is no longer a rigid axle.

In order for the vehicle seat according to the invention to reproduce even more closely the ergonomics of the shoulder, it has proved to be advantageous for, preferably in an articulated manner, the first cross strut part to be held in receiving portions on the left backrest longitudinal strut and the central backrest longitudinal strut, and the second cross strut part to be held in receiving portions on the right backrest longitudinal strut and the central backrest longitudinal strut. In this case, the mobility of the entire upper region of the backrest frame basically corresponds to the mobility of the human shoulder region, meaning that back movements, in particular rotational and torsional movements of the back, are able to be supported particularly well by the seat according to the invention, and this in turn enhances seating comfort and minimises the likelihood of back complaints.

In order for the various sitting positions that may be adopted by users of the vehicle seat to be accommodated with respect to the backrest inclination, it has proved to be helpful for the lower cross strut to be pivotable with respect to the sitting surface frame about a horizontal axis which extends substantially perpendicular to the seat longitudinal direction.

To facilitate helical or torsional rotation, the lower cross strut has a central region, on which the central backrest longitudinal strut is arranged, and two regions which are angled therefrom in the seat longitudinal direction about an angle and on which the left backrest longitudinal strut and the right backrest longitudinal strut are arranged In order to produce helical rotations of the backrest frame which are as realistic as possible and, at the same time, to achieve adequate support in the side region for a user of the vehicle seat according to the invention, it has proved preferable for this angle to be 45°.

In principle it is indeed possible for the left and right backrest longitudinal struts to be rigidly fixed to the lower cross strut, the helical rotation then being produced by resilient properties of the left and right backrest longitudinal struts over their longitudinal extension. However, it is advantageous for the left backrest longitudinal strut to be arranged on one angled region so as to be pivotable about an axis and for the right backrest longitudinal strut to be arranged on the other angled region so as to be pivotable about another axis.

To achieve a sitting position which is as comfortable and pleasant as possible, the central backrest longitudinal strut is constructed in a substantially planar manner as a longitudinal component. In this manner, the pressure exerted by the back of a vehicle seat user onto the backrest frame is able to be dissipated over a large area by the central backrest longitudinal strut, without pressure points in the back region of the user from small surface regions acting on the user's back, potentially through an upholstery of the backrest frame.

For the same reasons, the embodiment aims for the left backrest longitudinal strut to be substantially planar, the upper end thereof being angled about an angle with respect to the lower end, and for the right backrest longitudinal strut to be substantially planar, the upper end thereof being angled about the same angle with respect to the lower end.

The choice of materials for the backrest longitudinal strut and the cross struts is wide, although metal or plastics material are generally chosen since, in terms of their dimensional stability and resilience, these materials have already been tested in many automotive engineering fields and can be adapted to the most diverse of requirements, while still meeting the most stringent of safety requirements and standards.

The lower the cross strut can, on the one hand, be constructed, as an integral component of the sitting surface frame, in one piece therewith or with a part thereof.

On the other hand, it is of course also conceivable for the lower cross strut to be arranged on the sitting surface frame as a separate component, preferably by means of angle brackets, in which said cross strut is pivotably held about the axis.

According to a further inventive idea of the invention, it can be provided for at least the central backrest longitudinal strut to accumulate a restoring force during pivoting, preferably a restoring force generated by a spring. This feature ensures that the backrest frame is of a stability which is not deflected out of its rest position according to a normal position at the slightest force application. Such a restoring force also ensures that rotational movement back to the normal position is supported by the backrest frame.

In addition to the central longitudinal strut, while pivoting out of their rest position according to a normal position, the right and left backrest longitudinal struts can of course also accumulate a restoring force, preferably a restoring force generated by a spring, as a result of which the return of the backrest frame having pivoted out of its rest position corresponding to a normal position is particularly smooth.

According to a standalone inventive idea, a vehicle comprising at least one above-described vehicle seat is also intended for protection.

Further aims, advantages, features and applications of the present invention will become apparent from the following description of an embodiment, with reference to the drawings. All of the features which are described or graphically shown form the subject matter of the present invention either per se or in any expedient combination, irrespective of the manner in which they are combined in the claims or in the dependency references thereof.

DETAILED DESCRIPTION

Figure 1:
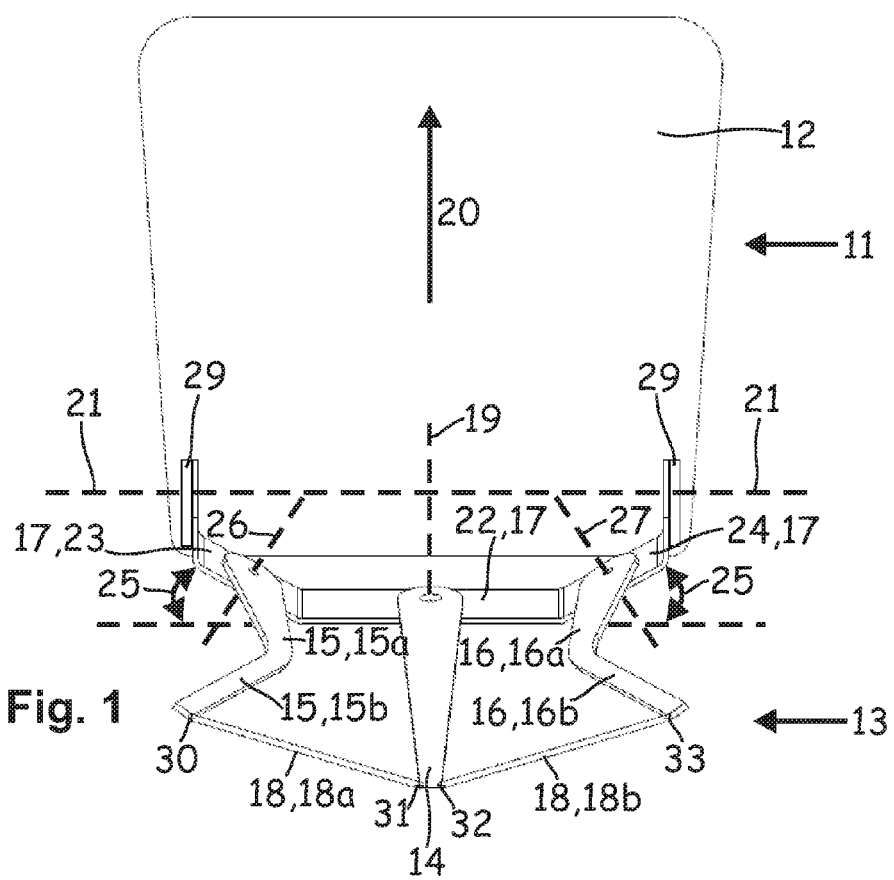
FIG. 1: is a top view of an embodiment of a seat frame of a vehicle seat according to the invention in a normal position.
Figure 2:
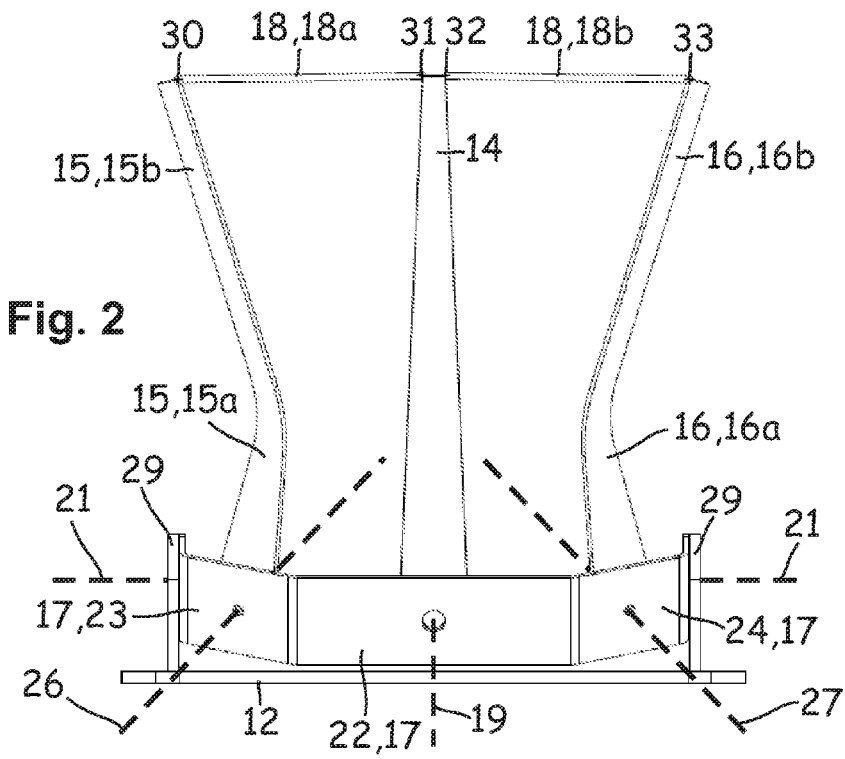
FIG. 2: is a rear view of the seat frame in FIG. 1.

FIGS. 1 to 4 show various views of an embodiment of a seat frame 11 of a vehicle seat according to the invention in a normal position, which is assumed when the back or upper body of the vehicle seat user is not rotated. The seat frame 11 basically consists of a sitting surface frame 12 and a backrest frame 13 which is pivotably arranged thereon at an inclination. In the present embodiment, the backrest frame 13 is arranged pivotably about an axis 21 on angle brackets 29, which are rigidly arranged on and fixed to the sitting surface frame 12.

The backrest frame 13 basically consists of central, left and right backrest longitudinal struts 14, 15 and 16, which are interconnected by means of a lower and an upper cross strut 17 and 18.

The lower cross strut 17 is mainly formed by a central region 22 and regions 23 and 24 which are arranged thereon and angled in the vehicle longitudinal direction 20. The regions 23 and 24 are angled about an angle 25, which is approximately 45° in this embodiment. The central backrest longitudinal strut 14 is arranged on the central region 22 of the lower cross strut 17 so as to be pivotable about a horizontal axis 19, whereas the left backrest longitudinal strut 15 is arranged on the angled region 23 so as to be pivotable about an axis 26 and the right backrest longitudinal strut 16 is arranged on the angled region 24 so as to be pivotable about an axis 27.

The upper cross strut 18 is divided in two in this embodiment, a first cross strut part 18a interconnecting the central and left backrest longitudinal struts 14 and 15, whereas a second cross strut part 18b interconnects the central and right backrest longitudinal struts 14 and 16. In this arrangement, the cross strut parts 18a and 18b are, however, not rigidly fixed to the backrest longitudinal struts 14, 15 and 16 but are held in receiving portions 30, 31, 32 and 33 in an articulated manner.

Both the left and the right backrest longitudinal struts 15, 16 are angular in this case. The left backrest longitudinal strut 15 can thus be broken down into a lower end 15a and an upper end 15b and the right backrest longitudinal strut 16 into a lower end 16a and an upper end 16b. The angles 28 between both upper and lower ends 15a, 16a and 15b, 16b are equal, yet are oriented in mirror symmetry, just like the arrangement of the left and right backrest longitudinal struts 15 and 16 on the lower cross strut 17.

Figure 3:
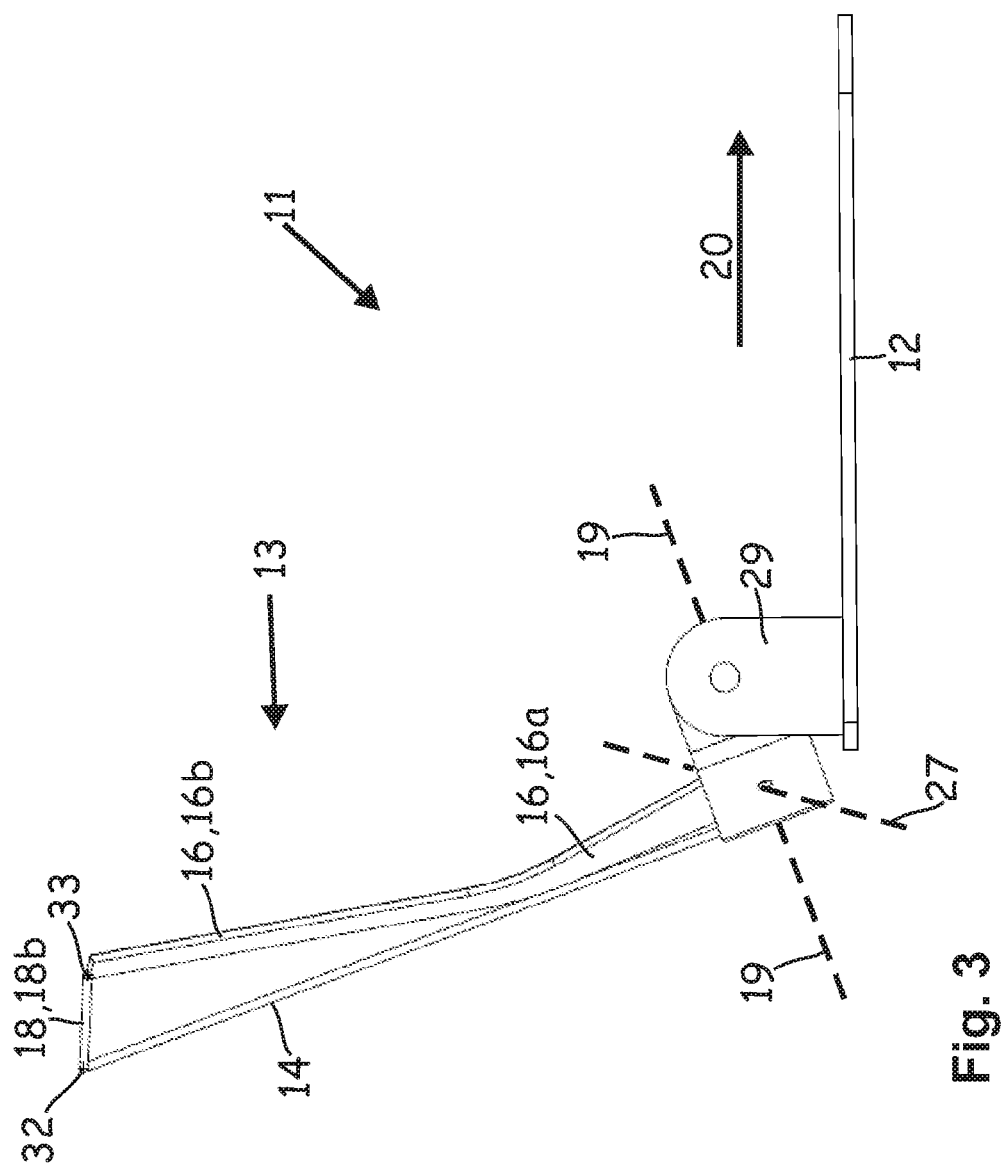
FIG. 3: is a side view of the seat frame in FIG. 1.
Figure 4:
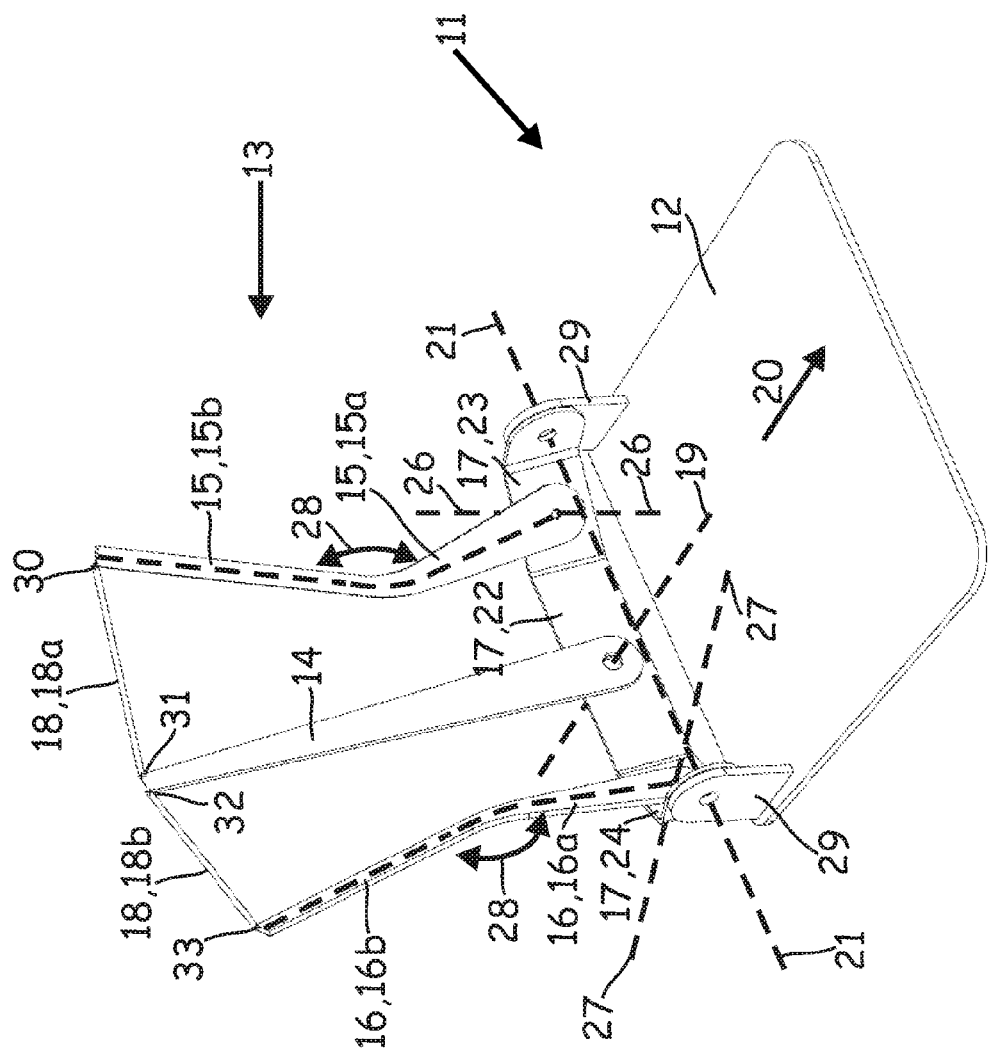
FIG. 4: is a perspective view of the seat frame in FIG. 1.

As can be seen in FIG. 3 in particular, the right backrest longitudinal strut 16, when viewed from the side, covers the left backrest longitudinal strut 15 in this normal position.

FIGS. 5 to 8 now show the embodiment in FIGS. 1 to 4, the backrest frame 13 being pivoted leftward, which corresponds to a rightward rotation of the back or upper body of the person sitting in the vehicle seat. In this case, the left backrest longitudinal strut 15 is pivoted leftwards about the axis 26, the central backrest longitudinal strut 14 about the axis 19 and the right backrest longitudinal strut 16 about the axis 27.

Figure 5:
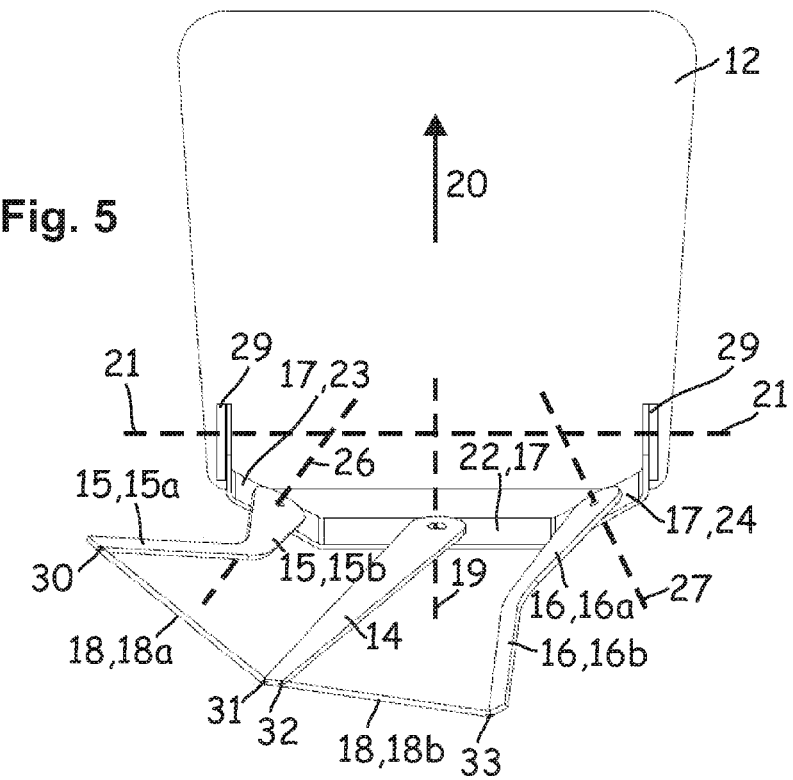
FIG. 5: is a top view of the embodiment of the seat frame in FIG. 1 in a leftward-pivoted position.
Figure 6:
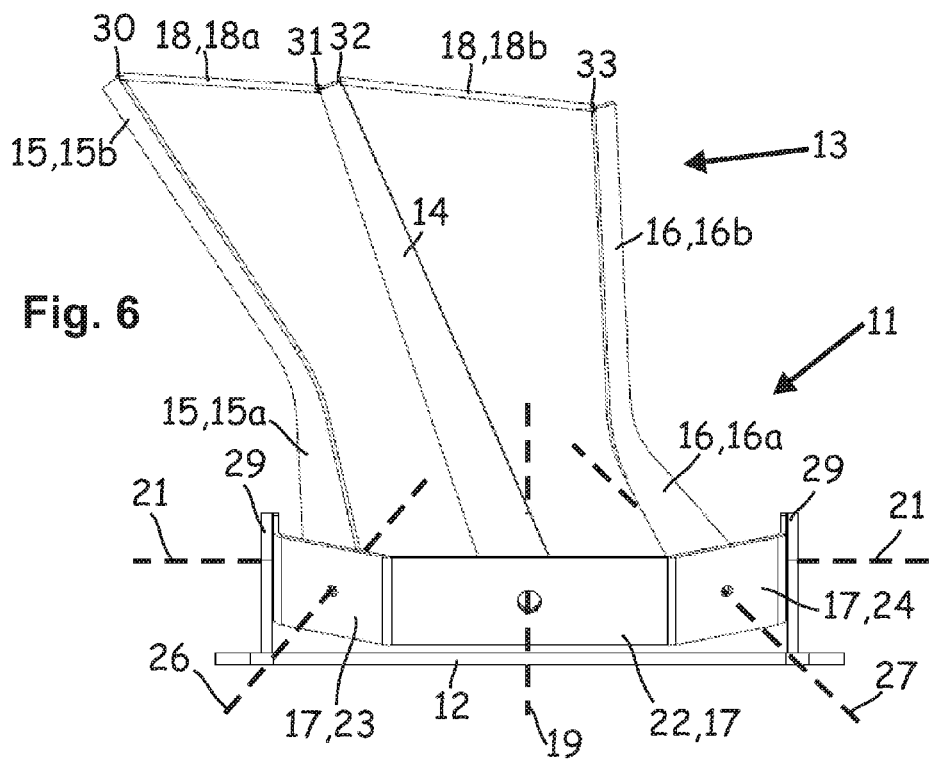
FIG. 6: is a rear view of the seat frame in FIG. 5.
Figure 7:
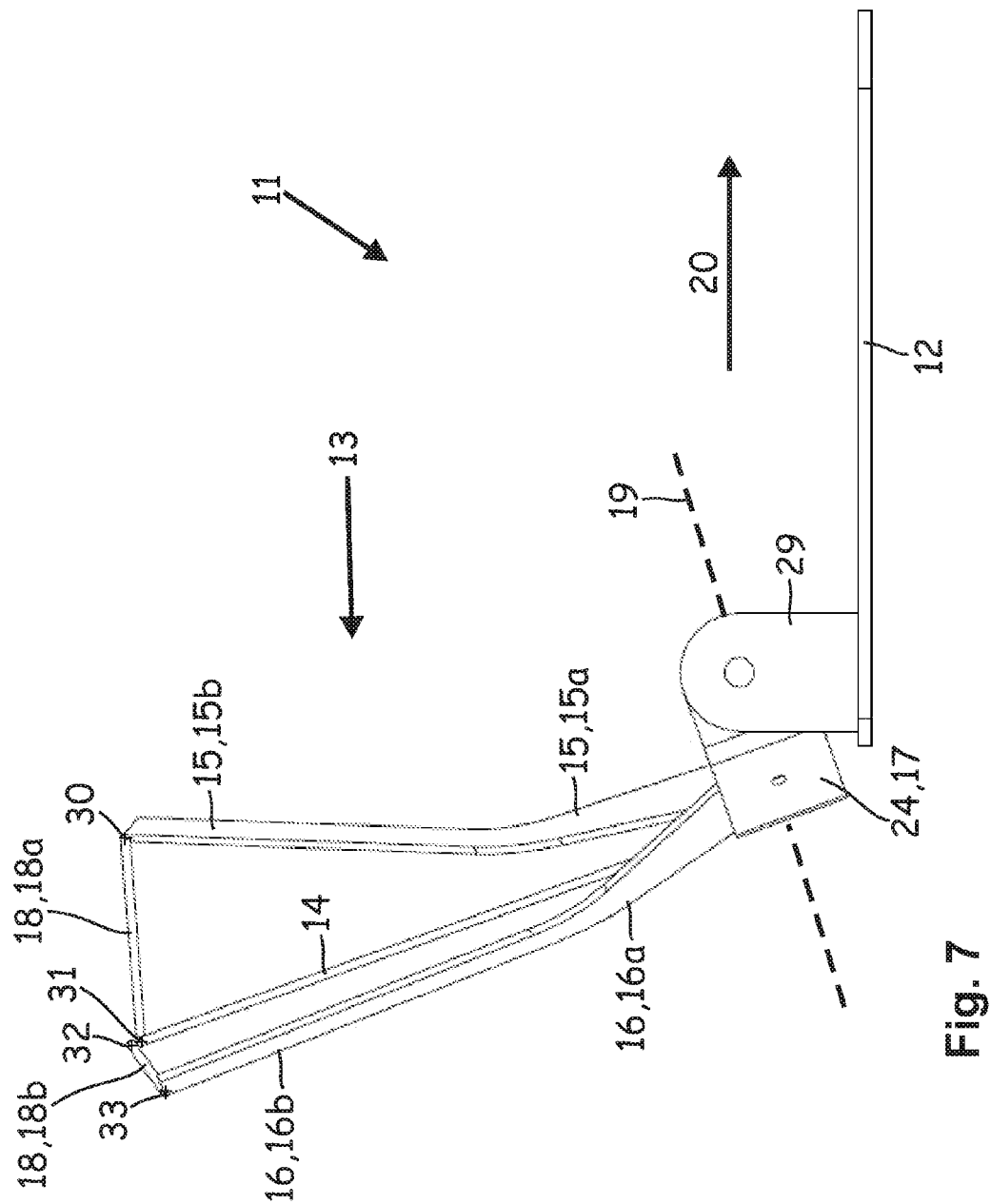
FIG. 7: is a side view of the seat frame in FIG. 5.
Figure 8:
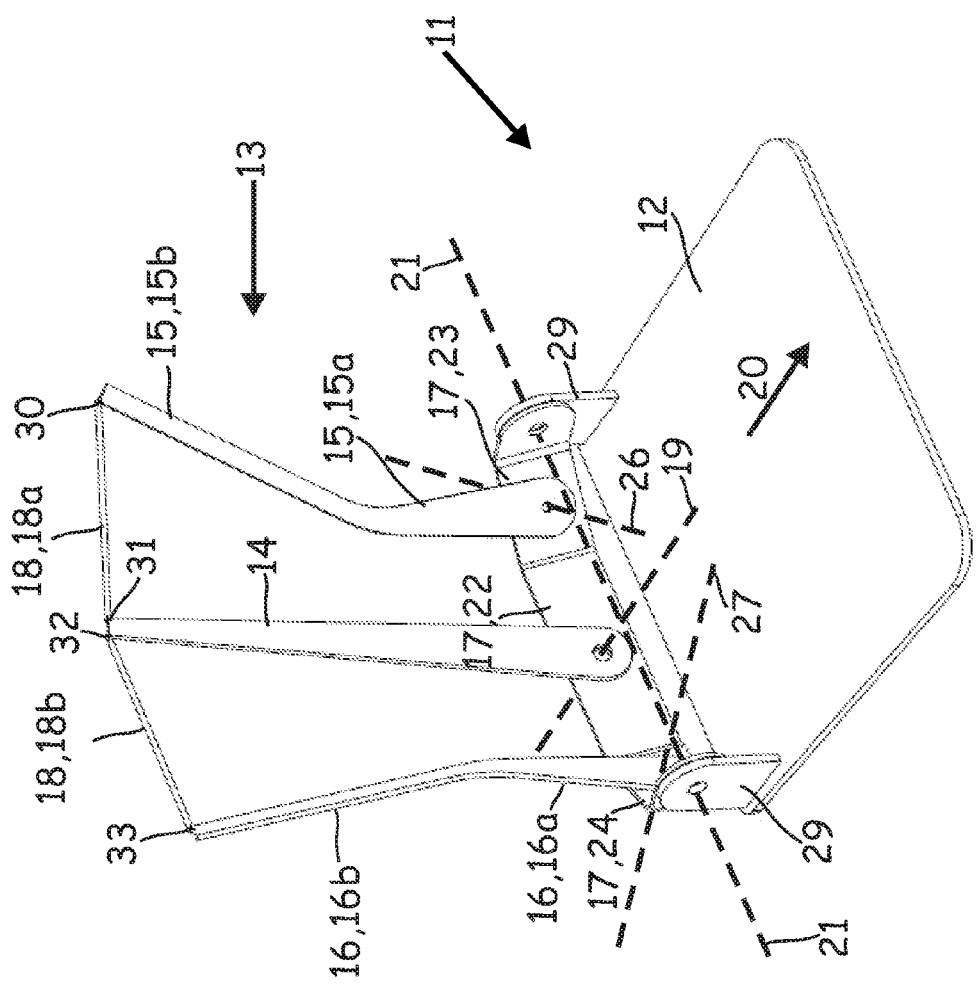
FIG. 8: is a perspective view of the seat frame in FIG. 5.

As can be seen in FIGS. 5 and 7 in particular, the right backrest longitudinal strut 16 has moved backwards in relation to the seat longitudinal direction 20 at both its lower end 16a and its upper end 16b, whereas the left backrest longitudinal strut 15 has moved forwards in relation to the seat longitudinal direction 20 at both its lower end 15a and its upper end 15b. As a result of this movement, the entire backrest frame 13 has been helically deformed, since the backrest longitudinal struts 14, 15 and 16 are fixed locally on the lower cross strut 17 at their pivots and are therefore locally rigid in their orientation.

By contrast, since it is divided in two and the two cross strut parts 18a and 18b are mounted in an articulated manner in the receiving portions 30 to 33 of the backrest longitudinal struts 14, 15 and 16, the cross strut 18 is not fixed in position but can follow the movement of the backrest longitudinal struts 14, 15 and 16 as they pivot about the axes 19, 26 and 27.

The figures do not explicitly show a spring-loading of the backrest longitudinal struts 14, 15 and 16. However, the advantageous result of this is that the pivoted backrest longitudinal struts 14, 15 and 16 move into their normal position in FIG. 1 to from their pivoted position in FIGS. 5 to 8 or also in FIGS. 9 to 12 in a virtually self-acting manner, without the person sitting in the vehicle seat needing to expend force to this effect. It is, however, necessary for force to be expended to bring about this pivoting from the rest position in FIGS. 1 to 4. This is, however, also desirable in order for an unwanted pivoting to not be triggered by even small external influences, as may occur owing to centrifugal accelerations during cornering for example.

FIGS. 9 to 12 now show the embodiment in FIGS. 1 to 4, the backrest frame 13 being pivoted rightward, which corresponds to a leftward rotation of the back or upper body of the person sitting in the vehicle seat. In this case, the left backrest longitudinal strut 15 is pivoted rightwards about the axis 26, the central backrest longitudinal strut 14 about the axis 19 and the right backrest longitudinal strut 16 about the axis 27.

Figure 9:
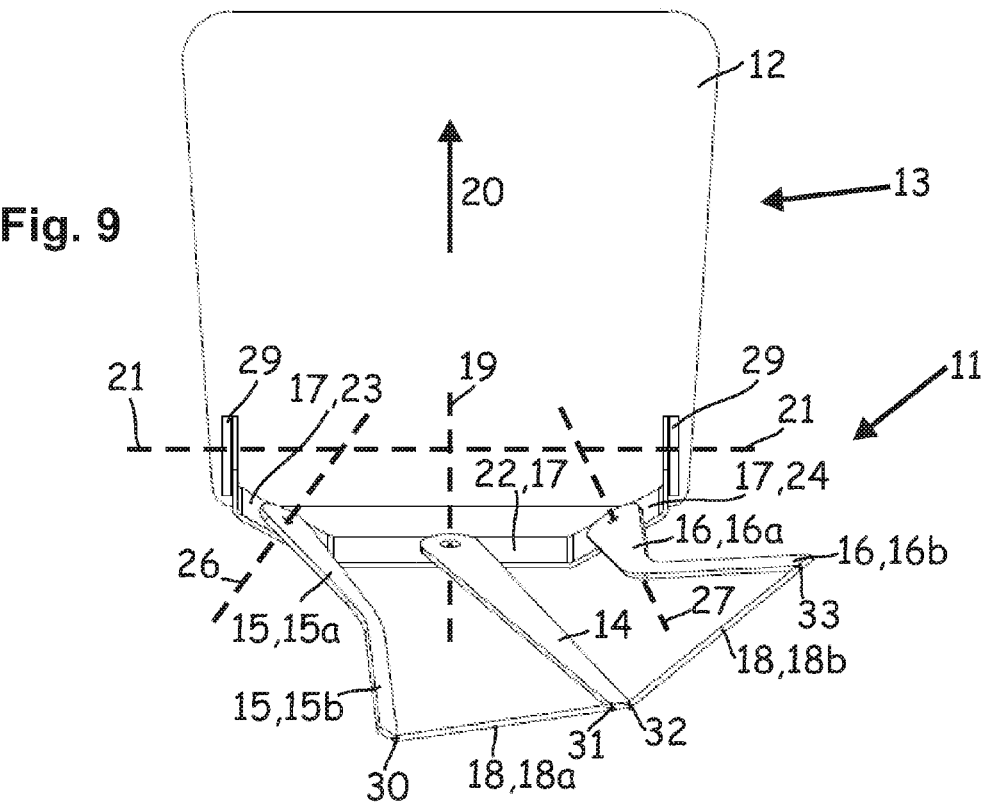
FIG. 9: is a top view of the embodiment of the seat frame in FIG. 1 in a rightward-pivoted position.
Figure 10:
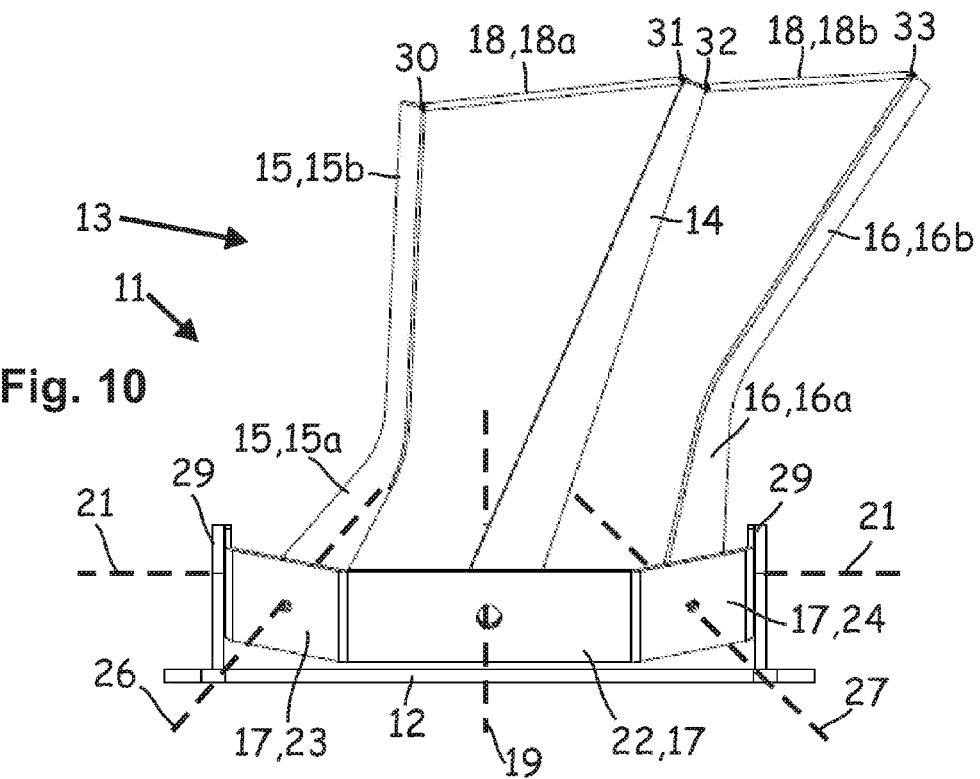
FIG. 10: is a rear view of the seat frame in FIG. 9.
Figure 11:
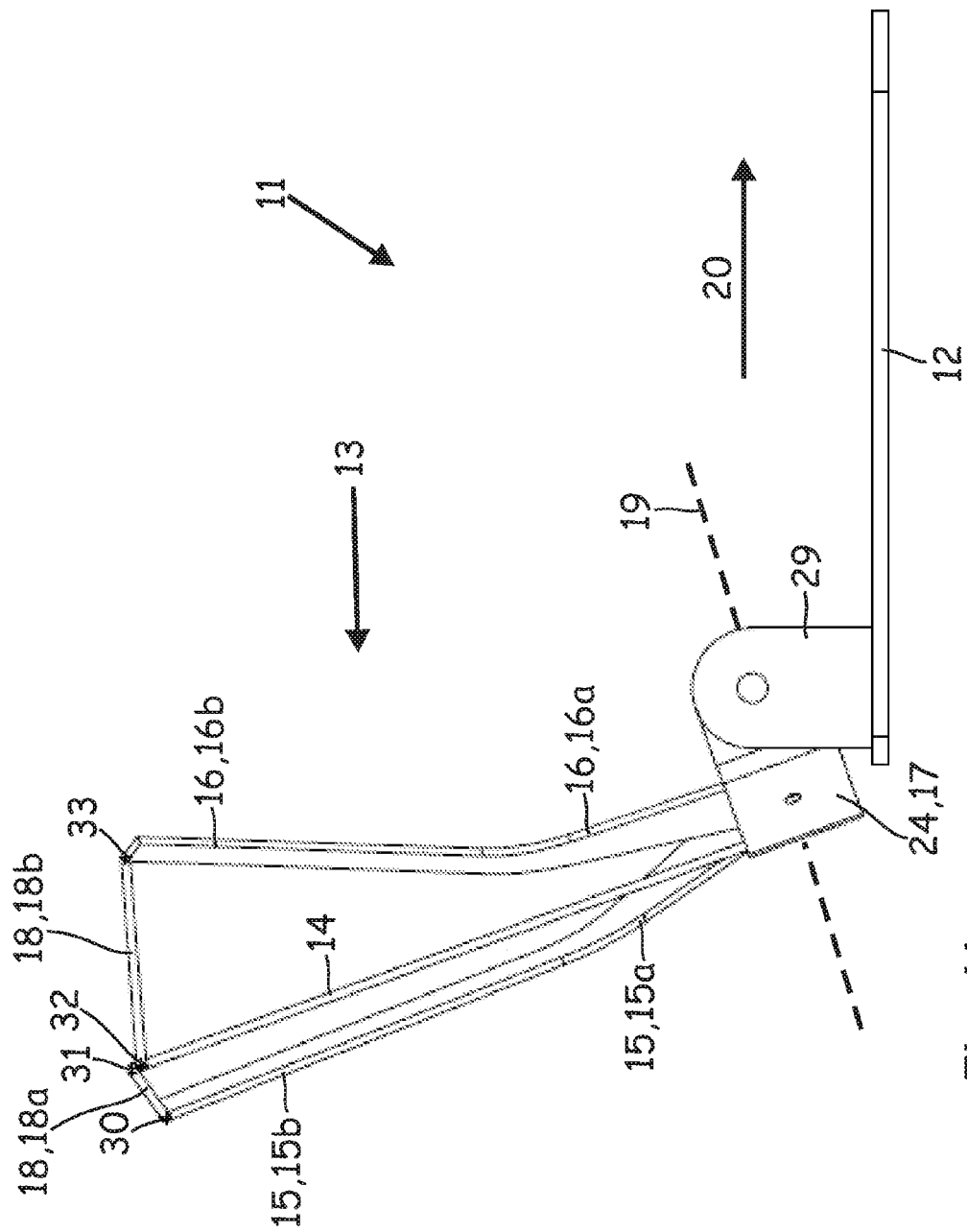
FIG. 11: is a side view of the seat frame in FIG. 9.
Figure 12:
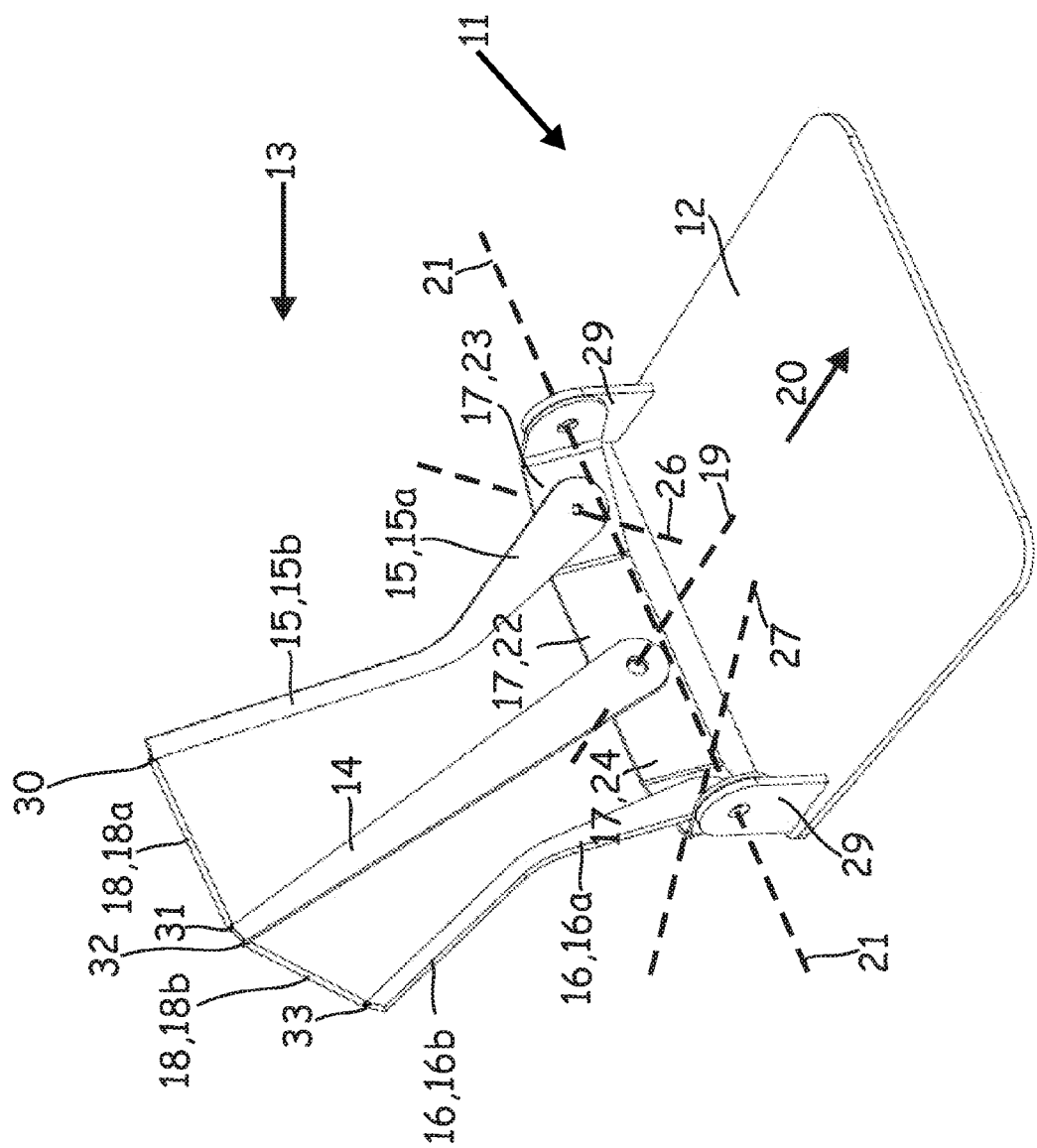
FIG. 12: is a perspective view of the seat frame in FIG. 9.

As can be seen in FIGS. 9 and 11 in particular, the left backrest longitudinal strut 15 has moved backwards in relation to the seat longitudinal direction 20 at both its lower end 15a and its upper end 15b, whereas the right backrest longitudinal strut 16 has moved forwards in relation to the seat longitudinal direction 20 at both its lower end 16a and its upper end 16b. As a result of this movement, the entire backrest frame 13 has been helically deformed, since the backrest longitudinal struts 14, 15 and 16 are fixed, with the exception of the permitted rotational movement, on the lower cross strut 17 and to this effect have set orientations.

LIST OF REFERENCE NUMERALS

11 Seat frame
12 Sitting surface frame
13 Backrest frame
14 Central backrest longitudinal strut
15 Left backrest longitudinal strut
15a Lower end of the left backrest longitudinal strut
15b Upper end of the left backrest longitudinal strut
16 Right backrest longitudinal strut
15a Lower end of the right backrest longitudinal strut
15b Upper end of the right backrest longitudinal strut
17 Lower cross strut
18 Upper cross strut
18a Cross strut part
18b Cross strut part
19 Axis
20 Seat longitudinal direction
21 Axis
22 Central region
23 Angled region
24 Angled region
25 Angle
26 Axis
27 Axis
28 Angle
29 Angle bracket
30 Receiving portion
31 Receiving portion
32 Receiving portion
33 Receiving portion

The invention claimed is:

1. A vehicle seat comprising:
a seat frame having a sitting surface frame and a backrest frame, wherein the backrest frame has at least one left backrest longitudinal strut, at least one right backrest longitudinal strut, an upper cross strut, and a lower cross strut, the right and left backrest longitudinal struts being pivotably arranged on the seat frame against a resistance in such a way that the backrest frame is helically deformable in the direction of height, wherein the lower cross strut has a central region and two angled regions which are angled therefrom in a seat longitudinal direction, and wherein the left backrest longitudinal strut is arranged on a first region of the two angled regions so as to be privotable about a first axis and the right backrest longitudinal strut is arranged on a second region of the angled regions so as to be pivotable about a second axis which is different from the first axis.

2. The vehicle seat according to claim 1, wherein the backrest frame has a central backrest longitudinal strut which is attached pivotably about a horizontal axis to the lower cross strut, the right and left backrest longitudinal struts being arranged at least in the region of upper ends of the right and left backrest longitudinal struts and outside a fictitious surface element formed by a 360° rotation of the central backrest longitudinal strut.

3. The vehicle seat according to claim 2, wherein the upper cross strut is divided into two portions including a first, a cross strut part arranged between the left backrest longitudinal strut and the central backrest longitudinal strut and a second cross strut part arranged between the right backrest longitudinal strut and the central backrest longitudinal strut.

4. The vehicle seat according to claim 3, wherein the cross strut part is held, in receiving portions on the left backrest longitudinal strut and the central backrest longitudinal strut, and in that the cross strut part is held, in receiving portions on the right backrest longitudinal strut and the central backrest longitudinal strut.

5. The vehicle seat according to claim 4, wherein the first cross strut part and the second cross strut part are each held in the receiving portions in an articulated manner.

6. The vehicle seat according to claim 2, wherein the central backrest longitudinal strut is constructed in a substantially planar manner as a longitudinal component.

7. The vehicle seat according to claim 2, wherein at least one of the backrest longitudinal struts and the cross struts are made of metal or plastic material.

8. The vehicle seat according to claim 2, wherein the backrest longitudinal struts or the cross struts are made of metal or plastic material.

9. The vehicle seat according to claim 1, wherein the lower cross strut is pivotable with respect to the sitting surface frame about a horizontal axis which extends substantially perpendicular to a seat longitudinal direction.

10. The vehicle seat according to claim 1, wherein the central backrest longitudinal strut is arranged on the central region, and the angle about which the two regions are angled is 45°.

11. The vehicle seat according to claim 1, wherein the left backrest longitudinal strut is substantially planar and an upper end thereof is angled about an angle with respect to a lower end, and wherein the right backrest longitudinal strut is substantially planar and an upper end thereof is angled about an angle with respect to a lower end.

12. The vehicle seat according to claim 1, wherein the cross strut is constructed as an integral component of the sitting surface frame, and in one piece therewith or with a part thereof.

13. The vehicle seat according to claim 1, wherein the cross strut is arranged on the sitting surface frame as a separate component.

14. The vehicle seat according to claim 13, wherein the cross strut is arranged by means of angle brackets in which said cross strut is pivotably held about a horizontal axis.

15. A vehicle comprising at least one vehicle seat according to claim 1.

16. A vehicle seat comprising:
a seat frame having a sitting surface frame; and
a backrest frame comprising:
   a left backrest longitudinal strut;
   a right backrest longitudinal strut;
   an upper cross strut; and
   a lower cross strut including a central region, a right angled region interconnected to a right end of the central region, and a left angled region interconnected to a left end of the central region, wherein the right angled region and the left angled region are angled toward a center of the central region, wherein the left angled region is in a first plane and the right angled region is in a second plane that is different from the first plane,
wherein a lower portion of the left backrest longitudinal strut is interconnected to the left angled region at a left pivot point such that the left backrest longitudinal strut is rotatable about a first axis extending through the left pivot point and oriented perpendicular to the first plane;
wherein a lower portion of the right backrest longitudinal strut is interconnected to the right angled region at a right pivot point such that the right backrest longitudinal strut is rotatable about a second axis extending through the right pivot point and oriented perpendicular to the second plane.

\* \* \* \* \*